Patented Sept. 28, 1948

2,450,119

UNITED STATES PATENT OFFICE 2,450,119

ISOMERIZATION OF PINENE TO CAMPHENE

William F. Carson, Jr., Brunswick, Ga., assignor to Hercules Powder Company, Wilmington, Del., a corporation of Delaware No Drawing. Application July 21, 1943,
Serial No. 495,644

5 Claims. (Cl. 260—675.5)

This invention relates to improvements in terpene isomerization and more particularly to a new catalytic process for the preparation of camphene from pinene.

Camphene is an important chemical of industry, from which many products of commerce are made, one of which is camphor. Many methods have been suggested in the literature for the prepaartion of camphene from bornyl chloride, each method attempting to produce a chlorine-free product. Attempts to produce chlorine-free camphene have led to the development of various one-step methods using a catalyst to promote the isomerization of pinene directly to camphene, thus eliminating the bornyl chloride stage. Many methods have been suggested using various types of catalysts, both organic and inorganic as well as mineral to effect this one-step conversion of pinene directly to camphene. In all cases, where organic or inorganic type catalysts are used, the yield of desirable product has been relatively low, as, for example, in the neighborhood of about 15%. Of the mineral catalysts, many are no better than the organic and/or inorganic types, while others permit yields of camphene as high as 50%, but only after a comparatively long reaction period.

Now, in accordance with the present invention, a new catalytic process has been discovered wherein it has been found that the mineral, pyrophyllite, or a mineral product or rock containing essentially pyrophyllite will promote the isomerization of isomerizable terpenes. In particular it has been discovered that pyrophyllite will act in the presence of an isomerizable terpene to effect the production of relatively high yields of pure camphene in a relatively short period of time.

The method in accordance with this invention is illustrated by the following specific examples, all parts and percentages being by weight unless otherwise specified.

Example 1

Seven parts of pyrophyllite having a grain size of 325 mesh were added to 270 parts of alpha-pinene having a specific gravity of .8646 and the mixture heated at reflux temperature for five hours. The temperature of the reaction mixture during this heating period varied between an initial temperature of 145° C. and a maximum and final temperature of 166° C. The mixture was cooled to 85° C. and filtered to remove the catalyst. Fractionation of the filtrate produced a yield of 61½% solid camphene based on the weight of the alpha-pinene treated. The remaining products of reaction were made up largely of monocyclic terpenes and small amounts of terpene polymers.

The following examples were carried out in the manner described with respect to Example 1, conditions and results being tabulated as follows:

| Example | Terpene Source | Weight of Terpene Used | Catalyst | Mesh Size of Catalyst | Reaction Temp. | Reaction Temp. | Yield of Camphene |
|---|---|---|---|---|---|---|---|
| | | Gr. | Per cent | | ° C. | Hours | Per cent |
| 2 | Wood turpentine | 2,150 | 2.1 | 325 | 158–166 | 5 | 62 |
| 3 | Sulfate turpentine | 2,150 | 2.3 | 325 | 158–166 | 6 | 59 |
| 4 | Gum turpentine | 2,150 | 2.5 | 325 | 158–166 | 4 | 60 |

Pyrophyllite is an anhydrous silicate mineral of the mica group having a flaky structure, easy cleavage, and pseudo-hexagonal symmetry, owing to its being based upon sheets of linked silicon-oxygen tetrahedra of hexagonal type. Pyrophyllite may be represented by the type structure formula $O_6 \cdot Si_4 \cdot O_4(OH)_2 \cdot Al_4 \cdot (OH)_2O_4 \cdot Si_4 \cdot O_6$ it being understood that the sequence of formula between the centered periods represents the chemical composition of the sequence of layers, which go to make up the mineral. The structural formula may be simplified to an ideal type formula as follows: $Al_2(Si_4O_{10})(OH)_2$. Operable forms of pyrophyllite include the isomorphous substitution products wherein, for instance, Al of the ideal formula may be replaced with Fe. A typical analysis of commercial pyrophyllite containing quartz as an impurity shows 75.3% $SiO_2$; 22.5% $Al_2O_3$; 0.1% $Fe_2O_3$; 0.2% CaO; 0.3% $K_2O$; and 3.6% $H_2O$. A pyrophyllite used in accordance with this invention is found abundantly in and around Staley, North Carolina.

Pyrophyllite operates as a catalyst in the lump or unground form but is preferably used in the ground form for purposes of maximum conversion, convenience of use, and uniformity of reaction. Although reaction rates increase with increase in the fineness of the catalyst, little effect of fineness is noted above a grain size of about 200 mesh.

The novel catalytic conversion of an isomerizable terpene to camphene may be carried out at between about 85° C. and about the reflux temperature of the terpene being treated. The preferred operating range is between about 155 and about 167° C. at normal atmospheric pressure. Under proper conditions of pressure, temperatures up to 200° C. or higher may be used.

Catalytic conversion of terpenes to camphene may be made in a relatively short period of time, when using pyrophyllite or when using rock or a mineral product containing essentially pyrophyllite. When alpha-pinene was isomerized in accordance with the method of Example 1, it was found that a 90% conversion of the pinene was effected at the given temperature in ten minutes to give a yield of 62% camphene, based on total pinene used as compared to a four hour reaction period ordinarily used by the methods of the prior art to give comparable yields of camphene under similar conditions of temperature. The reaction time may vary over wide limits and may be between about 10 minutes and about 8 hours. Completeness of reaction is desirable. When the reaction is not carried to completeness, unreacted terpenes as, for example, alpha-pinene remain in small percentages and because of the relative closeness in boiling points of these unreacted terpenes and camphene, separation by the ordinary methods of fractional distillation is not feasible.

Terpenes that have been found to be isomerizable to camphene in the presence of pyrophyllite as the catalyst are alpha-pinene, beta-pinene, and such pinene-containing materials as gum turpentine, wood turpentine, or sulfate turpentine.

The ratio of catalyst to the terpene being treated may vary between about 0.01 and about 0.1 and is preferably between about 0.02 and about 0.03.

The process in accordance with this invention may be carried out as a batch process in liquid or vapor phase or as a continuous process in these same phases.

From the foregoing description, it is apparent that a new method of producing pure camphene in an efficient, effective, and economical manner has been discovered, wherein a terpene capable of being isomerized may be directly converted to camphene in a relatively short period of time by heating the terpene in the presence of the mineral pyrophyllite or a mineral product or rock containing essentially pyrophyllite.

What I claim and desire to protect by Letters Patent is:

1. The process of isomerizing a pinene to camphene which comprises heating a pinene at a temperature between about 85° C. and about 200° C. for about ten minutes to about eight hours in the presence of pyrophyllite, the ratio of pyrophyllite to said pinene being between about 0.01 and about 0.10.

2. The process of isomerizing turpentine to camphene which comprises heating turpentine at a temperature between about 85° C. and about 200° C. for about ten minutes to about eight hours in the presence of pyrophyllite, the ratio of pyrophyllite to said turpentine being between about 0.01 and about 0.10.

3. The process of isomerizing alpha-pinene to camphene which comprises heating alpha-pinene at a temperature between about 155° C. and about 167° C. for about ten minutes to about eight hours in the presence of pyrophyllite, the ratio of pyrophyllite to said alpha-pinene being between about 0.01 and about 0.10.

4. The process of isomerizing beta-pinene to camphene which comprises heating beta-pinene at a temperature between about 155° C. and about 167° C. for about ten minutes to about eight hours in the presence of pyrophyllite, the ratio of pyrophyllite to said beta-pinene being between about 0.02 and about 0.03.

5. The process of isomerizing alpha-pinene to camphene which comprises heating alpha-pinene at a temperature between about 155° C. and about 167° C. for about ten minutes in the presence of pyrophyllite, the ratio of pyrophyllite to said alpha-pinene being between about 0.02 and about 0.03, and separating the camphene from the reaction mixture by means of distillation.

WILLIAM F. CARSON, Jr.

REFERENCES CITED

The following references are of record in the file of this patent:

UNITED STATES PATENTS

| Number | Name | Date |
|---|---|---|
| 999,667 | Montaland | Aug. 1, 1911 |
| 1,831,105 | Fairley | Nov. 10, 1931 |
| 2,139,323 | Henke et al. | Sept. 6, 1938 |

FOREIGN PATENTS

| Number | Country | Date |
|---|---|---|
| 456,974 | Great Britain | Nov. 18, 1936 |

OTHER REFERENCES

Egloff et al., Isomerization of Pure Hydrocarbons, pub. by Reinhold Pub. Corp. N. Y. (1942), 334-7.